United States Patent
Deshpande et al.

(10) Patent No.: US 12,012,546 B2
(45) Date of Patent: Jun. 18, 2024

(54) ASPHALTENE INHIBITION AND/OR DISPERSION IN PETROLEUM FLUIDS

(71) Applicant: M-I L.L.C., Houston, TX (US)

(72) Inventors: Pradyumna Avinash Deshpande, Aberdeen (GB); Chandrashekhar Yeshwant Khandekar, Humble, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/250,193

(22) PCT Filed: Jun. 4, 2019

(86) PCT No.: PCT/US2019/035279
§ 371 (c)(1),
(2) Date: Dec. 11, 2020

(87) PCT Pub. No.: WO2019/240980
PCT Pub. Date: Dec. 19, 2019

(65) Prior Publication Data
US 2021/0115321 A1    Apr. 22, 2021

Related U.S. Application Data

(60) Provisional application No. 62/684,659, filed on Jun. 13, 2018.

(51) Int. Cl.
*C09K 8/524* (2006.01)
*C10G 21/00* (2006.01)

(52) U.S. Cl.
CPC .......... *C09K 8/524* (2013.01); *C10G 21/003* (2013.01); *C10G 2300/206* (2013.01)

(58) Field of Classification Search
CPC ................. C09K 8/524; C10G 21/003; C10G 2300/206
See application file for complete search history.

(56) References Cited

U.S. PATENT DOCUMENTS

| | | | |
|---|---|---|---|
| 3,679,582 A | 7/1972 | Wagenaar | |
| 4,455,149 A | 6/1984 | Satake et al. | |
| 4,997,580 A | 3/1991 | Karydas et al. | |
| 5,840,883 A * | 11/1998 | Suzuki | A61Q 19/00 536/110 |
| 5,872,270 A | 2/1999 | van Dam et al. | |
| 6,313,367 B1 * | 11/2001 | Breen | C10L 1/191 208/309 |
| 10,647,906 B2 | 5/2020 | Deshpande et al. | |
| 2003/0032562 A1 | 2/2003 | Crossman et al. | |
| 2008/0009422 A1 | 1/2008 | Patel et al. | |
| 2008/0069961 A1 | 3/2008 | Sarkar et al. | |
| 2009/0258800 A1 | 10/2009 | Halliday et al. | |
| 2011/0030961 A1 | 2/2011 | Maxey | |
| 2011/0092393 A1 * | 4/2011 | Faust, Jr. | F17D 1/16 507/90 |
| 2011/0136701 A1 | 6/2011 | Prebensen et al. | |
| 2012/0090878 A1 | 4/2012 | Hitomi et al. | |
| 2012/0316332 A1 | 12/2012 | Koike et al. | |
| 2013/0310467 A1 | 11/2013 | Morikaku et al. | |
| 2014/0305650 A1 | 10/2014 | Song et al. | |
| 2016/0108327 A1 | 4/2016 | Pulikkathara et al. | |

FOREIGN PATENT DOCUMENTS

| | | | | |
|---|---|---|---|---|
| CA | 2298880 | * | 8/2000 | |
| CA | 2298880 A1 | | 8/2000 | |
| JP | H10279983 A | * | 10/1998 | |
| JP | 2014034522 A | | 2/2014 | |
| KR | 101104037 B1 | | 2/2014 | |
| WO | 2002012674 A1 | | 2/2002 | |
| WO | 2002040827 A1 | | 5/2002 | |
| WO | WO 02/40827 | * | 5/2002 | |
| WO | 2008079855 A2 | | 7/2008 | |
| WO | 2015153542 A1 | | 10/2015 | |
| WO | 2017223028 A1 | | 12/2017 | |
| WO | WO 2017/223028 | * | 12/2017 | |
| WO | WO-2017223028 A1 | * | 12/2017 | ............ C10G 75/04 |

* cited by examiner

*Primary Examiner* — Kumar R Bhushan
(74) *Attorney, Agent, or Firm* — Matthew Goode

(57) ABSTRACT

Compositions may include an asphaltene dispersant that is the product of a reaction between a polysaccharide having at least two sugar subunits and one or more fatty acid reagents, and a petroleum fluid produced from a subterranean formation and containing asphaltenes therein. The asphaltene dispersant may have a molecular weight of at least 4000 Da. Compositions may further include an aromatic solvent. Methods may include contacting a hydrocarbon fluid with an asphaltene dispersant dissolved in an aromatic solvent, wherein the asphaltene dispersant is the product of the reaction of a polysaccharide and one or more fatty acid reagents. Methods may also include contacting a hydrocarbon fluid with an asphaltene, wherein the asphaltene dispersant is the product of the reaction of a polysaccharide and one or more fatty acid reagents and has a molecular weight of at least 4000 Da.

12 Claims, No Drawings

ASPHALTENE INHIBITION AND/OR DISPERSION IN PETROLEUM FLUIDS

This application claims priority to and the benefit of U.S. Provisional Application No. 62/684,659, filed Jun. 13, 2018, the entire disclosure of which is hereby incorporated herein by reference.

BACKGROUND

In the oil and gas industry, fluids produced from subterranean formations often contain varying levels of hydrocarbons, associated aqueous phases, and dissolved and suspended solids. During production operations, hydrocarbons may be depressurized and cooled during capture and various flow assurance challenges can arise that may negatively affect production and other downstream processes. Among these considerations, it may be important to control of precipitation and deposition of solids such as asphaltenes, waxes, organic and inorganic scales, hydrates, corrosion products, and formation solids.

Solids present in hydrocarbon-containing produced from subterranean formations may be only slightly soluble at reservoir pressure and temperature. As produced fluids undergo pressure and temperature changes during production, solids may precipitate from the fluids and deposit on downhole tools, pipe wall surface, tubes, tanks, and other equipment. Solid deposition may cause additional operational problems such as poor oil and water separation, increased fluid viscosity, and pressure drops in the production and transportation pipelines; all of which can cause reductions in output and substandard oil and water quality.

In prior approaches, problems of solid deposition have been resolved by deploying a variety of physical and chemical methods. Deposition mitigation by chemical methods may involve the use of dispersants, solvents, modifiers, and other additives that alter the size and shape of the particles responsible for the formation of deposits. For example, chemical additives may operate by disrupting the growth of solid particles or other crystalline materials, leading to a decrease in the average size of these insoluble impurities and inhibiting precipitate formation. In addition, chemical additives may also disperse deposited solids and remediate scale and wax buildup.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein are directed to compositions that may include an asphaltene dispersant that is the product of a reaction between a polysaccharide having at least two sugar subunits and one or more fatty acid reagents, an aromatic solvent, and a petroleum fluid produced from a subterranean formation and containing asphaltenes therein.

In another aspect, embodiments disclosed herein are directed to compositions that may include an asphaltene dispersant that is the product of a reaction between a polysaccharide and one or more fatty acid reagents, an aromatic solvent, and a petroleum fluid produced from a subterranean formation and containing asphaltenes therein, wherein the molecular weight of the asphaltene dispersant is at least 4000 Da.

In another aspect, embodiments disclosed herein are directed to methods that may include contacting a hydrocarbon fluid with an asphaltene dispersant dissolved in an aromatic solvent, wherein the asphaltene dispersant is the product of the reaction of a polysaccharide and one or more fatty acid reagents.

In another aspect, embodiments disclosed herein are directed to methods that may include contacting a hydrocarbon fluid with an asphaltene dispersant, wherein the asphaltene dispersant is the product of the reaction of a polysaccharide and one or more fatty acid reagents and the molecular weight of the dispersant is at least 4000 Da.

Other aspects and advantages of the disclosure will be apparent from the following description and the appended claims.

DETAILED DESCRIPTION

Embodiments disclosed herein relate generally to compositions for inhibiting the agglomeration of waxes, asphaltenes, and other insoluble materials in hydrocarbon fluids. In one or more embodiments, asphaltene dispersants in accordance with the present disclosure are the product of a reaction between a polysaccharide and a fatty acid reagent. In some embodiments, asphaltene dispersants include fatty acid ester derivatives of polysaccharides such as inulin and dextrin. Embodiments of the present disclosure are also directed to methods of inhibiting asphaltene agglomeration and precipitation in hydrocarbons transported within a formation, through various types of pipeline, or stored in vessels.

Hydrocarbons fluids produced from the reservoir may undergo a number of changes in pressure and temperature as the fluids are brought to the surface. Changes in temperature and pressure can affect the solubility of various components, such as asphaltenes, within a hydrocarbon fluid, which may lead to their precipitation and subsequent deposition.

Asphaltenes are organic materials containing aromatic and cyclic naphthenic compounds that may come in the form of polyaromatic or polycyclic structures, and which may include a number of alkyl chains and heteroatoms such as nitrogen, sulfur and oxygen. Asphaltenes are often described as the "hydrocarbon fraction," which contains a wide variety of heavy and polar molecules from crude oils that are soluble in aromatic solvents, but insoluble in normal alkane-based solvents such as pentane or heptane. Asphaltenes exist as a colloidal suspension stabilized by aromatic resins in crude oil and the stability of asphaltic dispersions may depend, in part, on the ratio of resin to asphaltene molecules. During production and transport of hydrocarbon fluids, asphaltenes may precipitate as a result of pressure drop, composition changes, pressure depletion above the saturation pressure, temperature changes, shear from turbulent flow, intermixing of incompatible fluids or materials that break the stability of the asphaltic dispersion, and other parameters such as water cut and electro-kinetic effects.

During the production of the well, the precipitation of asphaltenes can create aggregates that entrain solids, initiating the formation of sludges and other insoluble residues. Asphaltene deposits may accumulate on the surfaces of completions equipment and reservoir pore throats, leading to the impairment of production and other operational problems including but not limited to, plugging of equipment, pressure loss, increased utility costs, lost production due to downtime, and downgraded products from insufficient feeds. Particularly, when asphaltenes deposit on surfaces such as pipes walls and teller lines, it results in blockage in fluid flow. This is a significant issue when transporting hydrocarbons in subsea flowlines, where pipe walls may accumulate solid buildup. Further, sludge formation during shipping in storage tanks may result in a significant loss of the shipped hydrocarbon.

In one aspect, embodiments disclosed herein are directed to methods and compositions for inhibiting or dispersing the deposition of asphaltenes from hydrocarbon fluids within wellbores. In one or more embodiments, methods and compositions in accordance with the present disclosure are directed to inhibiting or dispersing asphaltene deposition for topside and downhole oilfield applications. Treatment fluid compositions of the present disclosure may be used in downhole and surface applications, including dispersing existing precipitates on wellbore equipment and wellbore surfaces, in addition to inhibiting asphaltene precipitation during production and transportation of various hydrocarbon fluids.

Asphaltene dispersants and treatment fluid compositions in accordance with the present disclosure may be used as additives that are provided to hydrocarbon mixtures to disperse asphaltene aggregates and/or prevent flocculation of heavy hydrocarbons. Treatment fluids in accordance with the present disclosure may be suitable for use in downhole environments, at the surface, and in pipelines used to transport hydrocarbons. In some embodiments, asphaltene dispersants may be placed into a hydrocarbon production stream at any point, including within the wellbore, at the surface of the well, and during transport of the hydrocarbon stream through pipelines or storage tanks.

Asphaltene dispersant compositions of the present disclosure may be mixed with hydrocarbon fluids either by batch treatment or by continuous injection. In some embodiments, asphaltene dispersants may be used as a wellbore fluid additive. Further, compositions in accordance with the present disclosure may inhibitor asphaltene agglomeration under HPHT conditions. In some embodiments, treatment compositions may contain an asphaltene dispersant combined with one or more aromatic solvents.

In one or more embodiments, asphaltene dispersants may be used in conjunction with one or more aromatic solvents that may increase the dispersion and/or inhibitory effects of the treatment. Aromatic solvents in accordance with the present disclosure may be combined with an asphaltene dispersant prior to injection downhole or subsequent to the injection of the asphaltene dispersant or other wellbore fluid. Suitable aromatic solvents of the composition of this invention include benzenes, alkylbenzene derivatives such as toluene, xylene, di and trimethyl benzene, cumene, and the like, polycyclic aromatics such as naphthalenes and derivatives thereof, and mixtures thereof, including fluids such as Aromatic 100 (a C9-C10 dialkyl and trialkylbenzene), Aromatic 150 (C10-C12 alkyl benzenes) and Aromatic 200 (C12-C15 alkylnapthalenes). While a number of solvents are disclosed, it is also envisioned that other solvents may be selected that are miscible with petroleum fluids such as crude oil, condensates, diesel, and the like. In one or more embodiments, wellbore treatment compositions may contain one or more aromatic solvents at a percent by volume (vol %) that ranges from 1 vol % to 90 vol %.

In one or more embodiments, asphaltene dispersants may be formulated with one or more nonpolar solvents such as kerosene, dipentene, naptha, cycloaliphatics such as cyclopentane, cyclohexene, methylcyclopentane, and derivatives, and terpenes and terpenoids, such as d-limonene, turpentine, pinene, and citronellol. Solvents in accordance with the present disclosure may be combined with an asphaltene dispersant at a percent by volume ranging from a lower limit selected from one of 0.1 vol %, 0.5 vol %, 1 vol %, to an upper limit selected from one of 5 vol %, 10 vol %, and 20 vol %, where any lower limit may be combined with any upper limit.

During application, in some embodiments, asphaltene dispersants may be injected from a surface source into wells or flow lines in order to treat formation fluids and to prevent or control precipitation. Methods in accordance with the present disclosure may include admixing an asphaltene dispersant with a hydrocarbon fluid in an effective amount, i.e., an amount sufficient to produce some reduction in the precipitation of asphaltene or poorly soluble aggregates at decreased temperatures, as compared to an untreated fluid. For example, asphaltene dispersants may be added at a concentration that may range from a lower limit selected from any of 0.0001 percent by weight (wt %), 0.001 wt %, 0.1 wt %, 1 wt %, and 2 wt % to an upper limit selected from any of 1 wt %, 2 wt %, 5 wt %, 10 wt %, and 15 wt %, where the concentration of the wax modifier may range from any lower limit to any upper limit. In further embodiments, asphaltene inhibitors in accordance with the present disclosure may be added to treat a hydrocarbon fluid at a concentration that may range from about 0.001 wt % to 10 wt %, and from 0.001 wt % to 0.1 wt % in more particular embodiments One skilled in the art would appreciate that the desired asphaltene dispersant utilized for a given application depends upon the type of fluid being treated, and that the preferred concentration is the amount sufficient to achieve the most asphaltene dispersion at the lowest dosage of dispersant. The final concentration (for a stationary body of hydrocarbon) or rate of addition (for a hydrocarbon stream) of asphaltene dispersant may vary according to a number of factors that may include the base fluid type, the asphaltene content in the fluid, the carbon number distribution of the fluid, the type of dispersant added, the degree of dispersion and viscosity correction desired, the ambient conditions, the presence of aqueous phases, and the like. The optimum dosage, or dosage rate, may be estimated by a number of laboratory measurements such as, viscosity, asphaltene deposition tendency, and the like. Therefore, there are no limitations in this regard.

In one or more embodiments, asphaltene dispersants may include polysaccharides derivatized with alkyl chains or other hydrophobic domains. For example, dispersants may be structured so that part of the molecule contains a long-chain alkyl group soluble in the paraffin-containing fluid, while the polysaccharide backbone imparts some degree of solubility and dispersive properties. The alkyl chains present on the asphaltene dispersant aid solubility in nonpolar solvents, while the polysaccharide backbone of the modifier may incorporate on the surface of growing asphaltene agglomerations, thus inhibiting extensive flocculation and subsequent precipitation.

Polysaccharide Derivatives

In one or more embodiments, the asphaltene dispersants may include polysaccharides derivatized with one or more fatty acid reagents. Polysaccharides in accordance with the present disclosure may include inulins and dextrins. Inulins are a group of naturally occurring polysaccharides that belong to a class of dietary fibers known as fructans.

Structurally, inulins are chains of repeating fructose subunits having terminal glucose subunits. Inulin derivatives in accordance with the present disclosure may be of the general formula (I), where A may be varied between a group derived from one or more fatty acid reagents, or hydrogen, with the proviso that at least one A of the general formula (I) be a group derived from a fatty acid reagent, n is the degree of polymerization and be 2 or more, and A' is a group derived from a fatty acid reagent, H, or the glucosyl derivative structure (II).

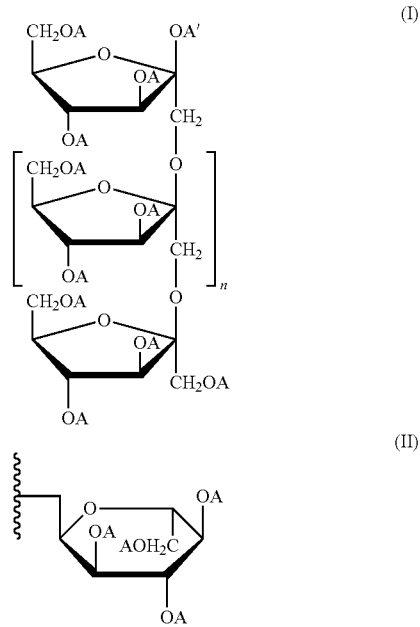

In some embodiments, asphaltene dispersants may be an inulin derivatized with one or more stearic acid esters.

In one or more embodiments, asphaltene dispersants in accordance with the present disclosure may be a dextrin derivative having the general structure of formula (III), where R is a group derived from one or more fatty acid or fatty acyl chloride reagents, or hydrogen, with the proviso that at least one R be a group derived from a fatty acid or fatty acyl acid reagent, and n is the degree of polymerization, which may be 2 or more in various embodiments or greater than 4 in other embodiments.

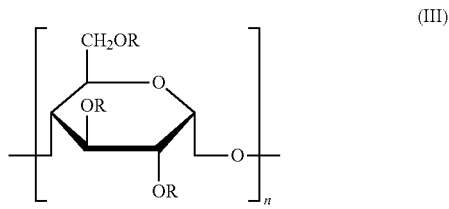

In some embodiments, wax modifiers may be a dextrin derivatized with one or more esters prepared from a fatty acid or fatty acyl chloride reagent selected from palmitic acid or 2-ethylhexylnoic acid, acyl chloride derivatives thereof, and mixtures thereof.

Polysaccharide derivatives in accordance with the present disclosure may have a molecular weight that varies from a number average molecular weight of greater than 1 kDa in some embodiments, at least 4 kDa in other embodiments, and of at least 5 kDa in further embodiments.

Fatty Acid Reagents

In some embodiments, the fatty acid reagent may be branched or linear fatty acids. In some embodiments, the fatty acid reagent may have a number of carbons of 6 or more, and ranging from 12 to 32 in one or more embodiments. In one or more embodiments, polysaccharide derivatives may include polysaccharides derivatized with a mixture of fatty acid reagents. In some embodiments, mixtures of fatty acid reagents may include reagents producing branched chain and linear esters. As used herein, "fatty acid reagents" include all reagents capable of generating a fatty ester when combined with a hydroxyl-containing species such as a polysaccharide, including fatty acids and activated derivatives thereof such as fatty acyl chlorides and activated esters such as carbodiimides or hydroxy-benzotriazole derivatives.

Fatty acid reagents may include linear fatty acids, derivatives thereof, and mixtures thereof such as butyric acid, valeric acid, caproic acid, enthanic acid, caprylic acid, pelargonic acid, capric acid, undecylic acid, lauric acid, tridecyclic acid, mysristic acid, pentadecylic acid, palmitic acid, margaric acid, stearic acid, and the like, in addition to unsaturated fatty acids, derivatives thereof, and mixtures thereof such as myristoleic acid, palmitoleic acid, oleic acid, linoleic acid, alpha-linoleic acid, erucic acid, ricinoleic acid, and the like. In one or more embodiments, the fatty acid reagent or derivative thereof may include a saturated aliphatic hydrocarbon group having 16 or more carbon atoms.

In some embodiments, saturated fatty acids may include branched fatty acids, derivatives thereof, and mixtures thereof, such as isobutyric acid, isovaleric acid, 2-ethylbutyric acid, ethylmethylacetic acid, isoheptanoic acid, 2-ethylhexanoic acid, isononanoic acid, isodecanoic acid, isotridecanoic acid, isomyristic acid, isopalmitic acid, isostearic acid, isoarachic acid, isohexacosanoic acid, and the like.

In one or more embodiments, polysaccharide derivatives may include those derivatized a mixture of fatty acid reagent types such as linear, branched, saturated, unsaturated, and the like. In some embodiments, polysaccharides may be derivatized with a mixture of branched fatty acid groups and linear fatty acid groups. Polysaccharides may be derivatized with a ratio of branched fatty acid reagents to linear fatty acid reagents that falls within the range of 1:2 to 1:10 in some embodiments, and within the range of 1:5 to 1:10 in other embodiments.

EXAMPLES

Compositions

Example 1: Dextrin palmitate/2-ethylhexanote (RheopearlTL2), supplied from Miyoshi America Inc. Mn=11,100 Da Example 2: Dextrin palmitate (RheopearlTT2), supplied from Miyoshi America Inc. Mn=11,500 Da Example 3: Stearoyl inulin (Rheopearl ISK2), supplied by Miyoshi America Inc. Mn=5,500 Da Asphaltene Dispersant Test The above examples were tested as asphaltene dispersants for asphaltenic petroluem fluids through an asphaltene dispersant test (ADT), which is widely used to screen and evaluate asphaltene dispersants in the oil and gas industry. The ADT compares the asphaltene content of crude oils and evaluates the ability of asphaltene dispersanst to inhibit asphaltene precipitation. For the ADT test, 1% solution wt/wt was prepared for a blank, and samples including one of Example 1, Example 2, and Example 3. In the ADT, heptane is used as the solvent, which is nonpolar and, therefore, promotes the agglomeration and precipitation of polar asphaltenes. The better the dispersant is, the more asphaltene will be dispersed in the treated heptane and less precipitation will be observed at various time intervals.

In a typical ADT experiment, 100 μL of asphaltenic crude from Canada was added to a test tube containing 10 mL of heptane. The blank experiment only contained this mixture of crude oil and heptane. For other experiments, 100 or 200 ppm of one of Examples 1, 2, and 3 was added and shaken to mix. The mixtures were subsequently allowed to stand for 6 hours. In a similar manner, 150 μL samples of either Guyanese or Mexican oil was treated with Examples 1, 2, and 3 (Guyanese, 100 or 200 ppm; Mexican, 75 or 200 ppm) and the % asphaltene dispersion was recorded over 6 hours. The % asphaltene precipitation and relative % asphaltene dispersion were calculated for each experiment.

TABLE 1

ADT test on Canadian crude oil

| | | | Canadian oil | | | | | |
|---|---|---|---|---|---|---|---|---|
| | | Dose, | Asphaltene ppt | | | Ashphaltene % | | |
| Exp. | Product | ppm | 2 h | 4 h | 6 h | 2 h | 4 h | 6 h |
| 1 | Blank | | 0.9 | 0.8 | 0.65 | 0.0% | 0.0% | 0.0% |
| 2 | Example 1 | 100 | 0.01 | 0.01 | 0.02 | 98.9% | 98.8% | 96.9% |
| 3 | | 200 | 0.01 | 0.01 | 0.01 | 98.9% | 98.8% | 98.5% |
| 4 | Example 2 | 100 | 0.01 | 0.01 | 0.025 | 98.9% | 98.8% | 96.2% |
| 5 | | 200 | 0.01 | 0.01 | 0.01 | 98.9% | 98.8% | 98.5% |
| 6 | Example 3 | 100 | 0.85 | 0.8 | 0.75 | 5.6% | 0.0% | −15.4% |
| 7 | | 200 | 0.04 | 0.05 | 0.06 | 95.6% | 93.8% | 90.8% |

TABLE 2

ADT test for Guyanese crude oil

| | | | Guyanese oil | | | | | |
|---|---|---|---|---|---|---|---|---|
| | | Dose, | Asphaltene ppt | | | Ashphaltene % | | |
| Exp. | Product | ppm | 2 h | 4 h | 6 h | 2 h | 4 h | 6 h |
| 1 | Blank | | 0.7 | 0.6 | 0.55 | 0.0% | 0.0% | 0.0% |
| 2 | Example 1 | 100 | 0.01 | 0.01 | 0.01 | 98.6% | 98.3% | 98.2% |
| 3 | | 200 | 0.01 | 0.01 | 0.01 | 98.6% | 98.3% | 98.2% |
| 4 | Example 2 | 100 | 0.01 | 0.01 | 0.01 | 98.6% | 98.3% | 98.2% |
| 5 | | 200 | 0.01 | 0.01 | 0.01 | 98.6% | 98.3% | 98.2% |
| 6 | Example 3 | 100 | 0.7 | 0.6 | 0.55 | 0.0% | 0.0% | 0.0% |
| 7 | | 200 | 0.7 | 0.6 | 0.55 | 0.0% | 0.0% | 0.0% |

TABLE 3

ADT test for Mexican crude oil

| | | | Mexican oil | | | | | |
|---|---|---|---|---|---|---|---|---|
| | | Dose, | Asphaltene ppt | | | Ashphaltene % | | |
| Exp. | Product | ppm | 2 h | 4 h | 6 h | 2 h | 4 h | 6 h |
| 1 | Blank | | 0.9 | 0.8 | 0.65 | 0.0% | 0.0% | 0.0% |
| 2 | Example 1 | 75 | 0.01 | 0.01 | 0.02 | 98.9% | 98.8% | 96.9% |
| 3 | | 200 | 0.01 | 0.01 | 0.01 | 98.9% | 98.8% | 98.5% |
| 4 | Example 2 | 75 | 0.01 | 0.01 | 0.025 | 98.9% | 98.8% | 96.2% |
| 5 | | 200 | 0.01 | 0.01 | 0.01 | 98.9% | 98.8% | 98.5% |
| 6 | Example 3 | 75 | 0.85 | 0.8 | 0.75 | 5.6% | 0.0% | −15.4% |
| 7 | | 200 | 0.85 | 0.8 | 0.75 | 5.6% | 0.0% | −15.4% |

Polymer Solubility Test

To utilize the asphaltene dispersants discussed herein for the treatment of hydrocarbon fluids, it is necessary to understand their solubility in various solvents. As the compositions of Examples 1, 2 and 3 feature the fatty acid esters of polysaccharides, they are highly hydrophobic and amorphous. The solubility of Examples 1, 2 and 3 were recorded in various solvents, by adding 5 g of the dispersant to 95 g of a solvent. The mixtures were then heated to 40° C. and subsequently cooled to room temperature, where the solubility was recorded.

TABLE 4

Solubility in solvents

| Product (5 wt %) | Xylene 95% | Acetone 95% | Cylohexane 95% | 2-ethylhexyl acetate 95% | Monoethyl eneglycol 95% | Methanol 95% | Butyl Acetate 95% |
|---|---|---|---|---|---|---|---|
| Example 1 | Soluble | Insoluble | Soluble | Insoluble | Insoluble | Insoluble | Insoluble |
| Example 2 | Soluble | Insoluble | Soluble | Insoluble | Insoluble | Insoluble | Insoluble |
| Example 3 | Soluble | Insoluble | Soluble | Insoluble | Insoluble | Insoluble | Insoluble |

From the above table it can observed that the dispersants of Example 1, Example 2 and Example 3 can be dissolved in nonpolar solvents such as cyclohexane and aromatics such as xylene, but are not soluble in polar solvents such as esters and alcohols.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method comprising:
   contacting a hydrocarbon fluid containing asphaltenes, the hydrocarbon fluid obtained from a subterranean formation, with an asphaltene dispersant dissolved in an aromatic solvent, wherein the asphaltene dispersant is the product of the reaction of a polysaccharide and one or more fatty acid reagents, wherein the polysaccharide is a dextrin of the general formula:

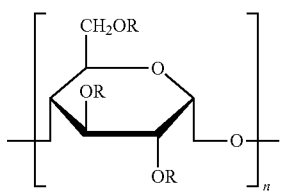

where R is one or more fatty acid reagents or hydrogen, with the proviso that at least one R be a fatty acid reagent, and n is the degree of polymerization, which is at least 2.

2. The method of claim 1, wherein the contacting inhibits asphaltene precipitation from the hydrocarbon fluid.

3. The method of claim 1, wherein the fatty acid reagent comprises 6-32 carbon chain acid and derivatives thereof.

4. The method of claim 1, wherein the asphaltene dispersant is added to the hydrocarbon fluid at a concentration in the range of 0.001 wt % to 10 wt %.

5. A method comprising:
   contacting a hydrocarbon fluid containing asphaltenes, the hydrocarbon fluid obtained from a subterranean formation, with an asphaltene dispersant, wherein the asphaltene dispersant is the product of the reaction of a polysaccharide and one or more fatty acid reagents and the molecular weight of the dispersant is at least 4000 Da, wherein the polysaccharide is a dextrin of the general formula:

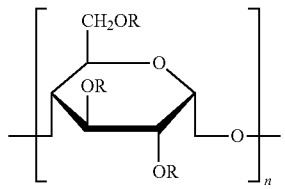

where R is one or more fatty acid reagents or hydrogen, with the proviso that at least one R be a fatty acid reagent, and n is the degree of polymerization.

6. The method of claim 5, wherein the contacting inhibits asphaltene precipitation from the hydrocarbon fluid.

7. The method of claim 5, wherein the fatty acid reagent comprises 6-32 carbon chain acid and derivatives.

8. The method of claim 5, wherein the asphaltene dispersant is added to the hydrocarbon fluid at a concentration in the range of 0.001 wt % to 10 wt %.

9. The method of claim 7, wherein the fatty acid reagent comprises palmitic acid.

10. The method of claim 3, wherein the fatty acid reagent comprises palmitic acid.

11. The method of claim 1, where the aromatic solvent comprises alkylbenzenes.

12. The method of claim 5, where the aromatic solvent comprises alkylbenzenes.

* * * * *